United States Patent [19]

Orthman

[11] Patent Number: 4,588,033
[45] Date of Patent: May 13, 1986

[54] COTTON ROOT CUTTER AND SHREDDER

[75] Inventor: Henry K. Orthman, Lexington, Nebr.

[73] Assignee: Orthman Manufacturing, Inc., Lexington, Nebr.

[21] Appl. No.: 647,173

[22] Filed: Sep. 4, 1984

[51] Int. Cl.$^4$ .............................................. A01D 13/00
[52] U.S. Cl. ........................................ 171/62; 171/24; 171/64
[58] Field of Search .................... 171/62, 64, 65, 66, 171/67, 83, 19, 24; 56/327 R; 172/733, 517, 193, 29

[56] References Cited

U.S. PATENT DOCUMENTS

| Re. 24,073 | 10/1955 | Alloway . | |
|---|---|---|---|
| 850,482 | 4/1907 | Miller | 171/64 |
| 1,443,741 | 1/1923 | Heath | 171/67 |
| 2,224,662 | 12/1940 | Thomson et al. | 56/192 |
| 2,302,973 | 11/1942 | Sargent | 171/24 |
| 2,305,254 | 12/1942 | Hirschkorn . | |
| 2,466,555 | 4/1949 | Paine et al. | 172/517 |
| 2,621,461 | 12/1952 | Tiedtke . | |
| 2,692,544 | 10/1954 | Jessup | 171/64 |
| 2,777,267 | 1/1957 | Thompson | 171/24 |
| 3,396,767 | 8/1968 | Blanshine . | |
| 3,396,914 | 9/1968 | Liebman . | |
| 3,537,530 | 11/1970 | Bettencourt | 171/62 |
| 3,800,879 | 4/1974 | Chant . | |
| 3,918,243 | 11/1975 | Lemanski | 171/64 |
| 4,015,667 | 4/1977 | Ruozi | 171/62 |

*Primary Examiner*—Robert A. Hafer
*Assistant Examiner*—Daniel Nolan
*Attorney, Agent, or Firm*—Zarley, McKee, Thomte, Voorhees & Sease

[57] ABSTRACT

An apparatus for uprooting and shredding cotton plants after harvest includes a below ground cutting blade having a forward cutting edge inclined rearwardly and to one side of the implement, which blade cooperates with an oppositely inclined above ground trash bar to uproot cotton plants and deposit them on the ground transversely of the direction of travel of the apparatus.

8 Claims, 4 Drawing Figures

U.S. Patent  May 13, 1986  4,588,033
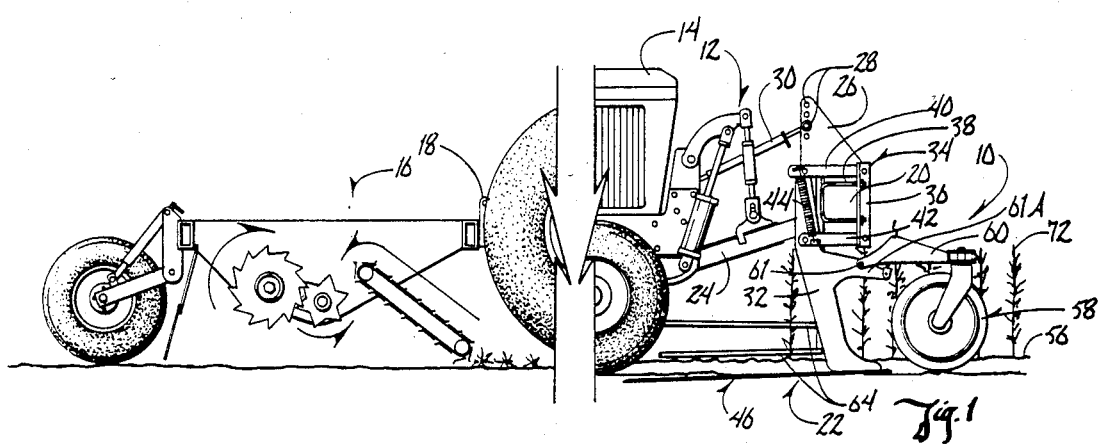
Fig. 1
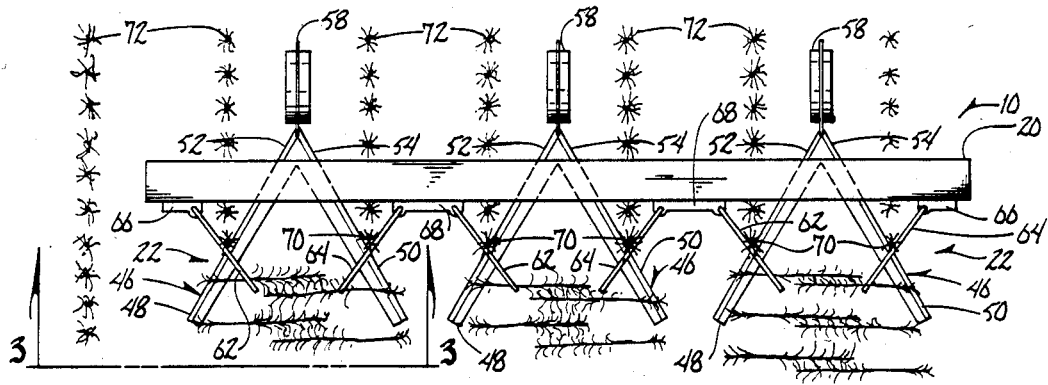
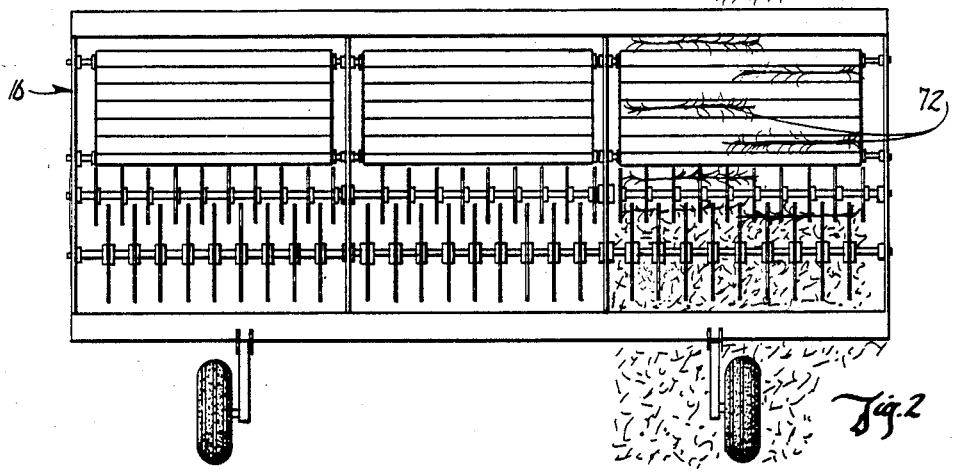
Fig. 2
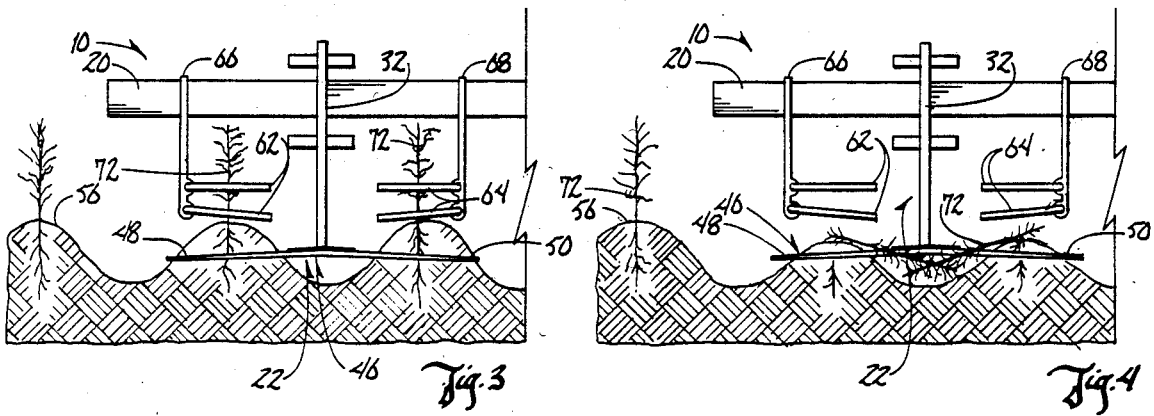
Fig. 3    Fig. 4

COTTON ROOT CUTTER AND SHREDDER

BACKGROUND OF THE INVENTION

The present invention is directed generally to an apparatus for uprooting and shredding cotton plants after harvest and more particularly to an apparatus wherein a below ground cutting blade cooperates with an oppositely inclined above ground trash bar to uproot cotton plants and deposit them on the ground transversely of the direction of travel of the apparatus.

In an effort to control the boll weevil, the cotton growing states have established laws requiring all cotton roots to be undercut and preferably brought to the ground surface by a specified date each year. The cotton plant after harvest is tough much like green willows, however, and under irrigation in the San Joaquin Valley, for example, it can be shoulder high. The common practice has been to cut the standing stalks with rotary choppers which reduce the plants to three to four inch stubs which are then very destructive to rubber tires. Two or three discings are then generally required to get root removal sufficient to pass state inspection. The discings have to be done with crawler tractors because of the inhospitable environment for rubber tires created by the standing root stubs left by the rotary cutters.

Prior machines have been developed tackle this cotton root problem. They are mostly two or four row massive machines with high horse power requirements and high dollar costs. One machine uses rubber tire wheels rotating against each other to pull the roots. Other machines are simply undercutters. These are heavy steel L-shaped blades that require enormous horse power and only do one thing, they cut the root underground.

Accordingly, a primary object of the invention is to provide an improved apparatus for cutting and uprooting cotton plants after harvest.

Another object is to provide such an apparatus with minimum horse power requirements.

Another object is to provide such an apparatus which is readily adapted for connection to and operation by a conventional agricultural tractor.

Finally, an object is to provide such an apparatus which is simple in construction, economical to manufacture and efficient and consistent in operation.

SUMMARY OF THE INVENTION

The cotton root cutter and extractor tool of the present invention includes an elongated cutter blade carried on an agricultural implement tool bar so that the blade is positioned, in the working position of the tool bar, generally horizontally below the ground surface with its forward cutting edge inclined rearwardly and to one side of the implement for loosening the soil, striking a cotton root and urging it toward that one side of the implement. An elongated trash bar is arranged in spaced relation above the cutter blade and inclined rearwardly and to the opposite side of the implement. The cutter blade and associated trash bar thus cooperate to present a somewhat open scissors-like V-notch to a row of cotton plants. The tool is positioned with the vertical line of intersection between the cutter blade and trash bar aligned with a crop row. Upon forward advancement of the tool, the root is cut and urged in one transverse direction by the cutter blade while the plant stalk is simultaneously struck and urged in the opposite transverse direction by the trash bar. The result is that each plant is uprooted and knocked down transversely of the direction of travel of the implement. The transversely arranged windrowed plants are then easily picked up by conventional windrow pick-up devices whereupon the plants may be shredded and deposited onto the ground surface.

The thin height and substantially horizontal disposition of the cutting blade minimizes the horse power requirements for advancing the blade through the soil. The positional relationship of the trash bar to the cutter blade enables the blade to function both as a root cutter and crop handler for arranging the uprooted plants on the ground surface. The opposite inclinations of the cutter blade and trash bar cause them to knock the plant down in a lateral direction so that the stems of the windrowed crops are arranged generally at 90° angles to the direction of travel of the tool for easy pick up.

BRIEF DESCRIPTION OF THE DRAWINGS

FIG. 1 is a foreshortened side elevational view showing the cotton root cutter and extractor implement of the invention mounted on the front end of a tractor having a shredder connected to the rearward end thereof, with portions broken away for clarity;

FIG. 2 is a top view of the cotton root cutter and extractor implement and shredder implement of FIG. 1;

FIG. 3 is an enlarged rear sectional view of the cotton root cutter and extractor tool in operation, as seen on line 3—3 in FIG. 2; and FIG. 4 is a rear sectional view, similar to FIG. 3, showing plants uprooted and arranged on the ground by the implement of the invention.

DESCRIPTION OF THE PREFERRED EMBODIMENT

The cotton root cutter and extractor implement 10 of the present invention is illustrated in FIG. 1 mounted by a three-point hitch type apparatus 12 to the front end of an agricultural tractor 14, having the cotton plant shredding implement 16 of the invention carried on three-point hitch 18 at the rearward end thereof.

Cotton root cutter and extractor implement 10 includes an elongated transversely extended tool bar 20 on which a number of cotton root cutters and extractor tools 22 are mounted in transversely spaced-apart relation. In the embodiment shown, the tool bar is equipped with spaced-apart brackets adapted for connection to the pivotal lower arms 24 of hitch 12 and an upstanding mounting plate 26 having a vertical array of holes 28 adapted for connection to the upper arm 30 of hitch 12.

Each tool 22 includes an upright and somewhat downwardly and forwardly inclined shank 32 connected by a wrap-around parallel linkage 34 to tool bar 20. Linkage 34 includes a front angle member 36 secured to the tool bar 20 by U-clamp 38, upper and lower rearwardly extended pivot arms 40 and 42, the rearward ends of which are pivotally connected to shank 32 as shown, and a tension spring 44 connected to and extended between the rearward ends of arms 40 and 42 to exert downward pressure on shank 32.

A generally V-shaped cutter blade 46 is secured to the lower end of shank 32 and extended generally horizontally rearwardly therefrom. Cutter blade 46 includes first and second blade portions 48 and 50 which diverge rearwardly and outwardly from one another to present respective inclined cutting edges 52 and 54 to adjacent crop rows as shown in FIG. 2.

As shown in FIGS. 1 and 3, the cutter blade 46 is positioned below the ground surface 56 when tool bar 20 is lowered to its working position FIG. 1. Depth control of the cutter blade 46 is provided by a height-adjustable caster wheel 58 carried on the forward end of a pivot arm 60 which is pivotally connected at 61 to a shank extension 61A. A crank 66 is provided for manually adjusting the height of caster wheel 58 relative to the cutter blade 56 for the desired depth control.

Associated with each cutter blade portion 48 and 50 is a respective trash bar 62, 64. The trash bars are elongated rods supported at their forward ends by respective brackets 66 or 68 to tool bar 20 at positions laterally spaced from the shank coupler 34. Each trash bar extends generally horizontally rearwardly in intersecting spaced relation above an associated cutter blade portion. Note that the trash bar 62 does not contact first blade portion 48 but appears to intersect the blade in a top plan view as in FIG. 2 so that a vertical line of intersection 70 is referred to. It is preferred that the trash bar 62 is relatively closely spaced to the cutter bar so as to engage a lower portion of the cotton plant stalk. Each trash bar is inclined rearwardly and toward a transverse direction opposite to the inclination of the associated cutter blade portion.

Accordingly, in operation, as tractor 14 advances the implement 10 across a field with the intersection lines 70 between the cutter blade and trash bar aligned with the crop rows as shown in FIGS. 2, 3 and 4, each plant 72 is simultaneously engaged by both a cutter blade and trash bar. With reference to FIG. 4, first cutter blade portion 48 cuts the root below ground level and urges the cut end of the plant outwardly to the left in FIG. 4. Simultaneously, the stalk is struck by the trash bar 62 just above ground level and urged inwardly to the right in FIG. 4. Continued advancement of the implement forces the stalk down onto the ground surface so that it lies transversely of the crop rows and transversely of the direction of travel of the implement.

With the cut plants arranged in windrows as illustrated in FIG. 2, they are readily picked up by shredding implement 16, shredded into small pieces and redeposited onto ground surface.

Whereas a preferred embodiment of the invention has been shown and described herein, it is apparent that many modifications, additions and substitutions may be made which are within the intended broad scope of the appended claims. Whereas the embodiment of the drawings illustrates a three-point hitch connection for both the cutting and extracting implement 10 and shredding implement 16, this form of connection is only illustrative and is not critical to the invention. Likewise, whereas the positional relationship between the trash bars and associated cutter blades is important to the invention, the specific means for mounting the trash bars is not critical. The trash bars could alternately be supported on the shank 32 so as to provide a single integral tool. The depth control wheels could alternately be mounted on the tool bar independently of the shank 32 if desired.

Thus there has been shown and described a cotton root cutter and extractor tool which accomplishes at least all of the stated objects.

I claim:

1. A cotton root cutter and extractor tool for an agricultural implement including forward and rearward ends, opposite sides, an elongated tool bar and means for supporting the tool bar in a working position on a prime mover, said tool comprising, an elongated cutter blade having a cutting edge, support means for mounting said cutter blade on and below the tool bar such that the cutter blade is positioned, in the working position of the tool bar, generally horizontally below the ground surface with the cutting edge inclined rearwardly and to one side of the implement for loosening the soil, striking a cotton root and urging it toward that one side of the implement, an elongated trash member having a forward edge, and means for positioning said trash member relative to said cutter blade such that the forward edge thereof is disposed in intersecting spaced relation above the cutter blade and inclined rearwardly and to the opposite side of the implement whereby, upon forward movement of the tool to engage a cotton plant at the intersection of the cutter blade and trash member, the plant is uprooted and displaced over the top of the cutter blade transversely of the direction of travel of the tool.

2. The tool of claim 1 wherein said cutter blade is generally V-shaped to include a second cutting edge inclined rearwardly and to the opposite side of the implement, and further comprising a second trash member having a forward edge, and means for positioning said second trash member relative to said second cutting edge such that the forward edge of the second trash member is in intersecting spaced relation above the second cutting edge and is inclined rearwardly and to said one side of the implement.

3. The tool of claim 1 wherein said trash member is generally horizontally disposed.

4. The tool of claim 1 wherein said trash member is positioned in relatively closely spaced relation above said cutter blade.

5. The tool of claim 1 further comprising a second elongated trash member positioned substantially parallel to and in vertically spaced relation above the aforementioned trash member.

6. The tool of claim 1 wherein said means for positioning said trash member comprises a bracket for supporting the trash member on the tool bar.

7. A cotton root cutter and extractor implement having forward and rearward ends, opposite sides, an elongated tool bar and means for supporting the tool bar in a working position on a prime mover, and a plurality of cotton root cutter and extractor tools arranged in transversely spaced relation along the tool bar for alignment with the crop rows of a cotton field, each tool comprising, an elongated cutter blade having a cutting edge, support means for mounting said cutter blade on and below the tool bar such that the cutter blade is positioned, in the working position of the tool bar, generally horizontally below the ground surface with the cutting edge inclined rearwardly and to one side of the implement for loosening the soil, striking a cotton root and urging it toward that one side of the implement, an elongated trash member having a forward edge, and means for positioning said trash member relative to said cutter blade such that the forward edge thereof is disposed in intersecting spaced relation above the cutter blade and inclined rearwardly and to the opposite side of the implement whereby, upon forward movement of the tool to engage a cotton plant at the intersection of the cutter blade and trash member, the plant is uprooted and displaced over the top of the cutter blade transversely of the direction of travel of the tool.

8. The implement of claim 7 wherein said cutter blade is generally V-shaped to include a second cutting edge inclined rearwardly and to the opposite side of the implement, and further comprising a second trash member having a forward edge, and means for positioning said second trash member relative to said second cutting edge such that the forward edge of the second trash member is in intersecting spaced relation above the second cutting edge and is inclined rearwardly and to said one side of the implement.

* * * * *